March 17, 1964  J. F. KLEBE  3,125,637
COMPOSITION AND APPARATUS USED IN THE SAME
Filed June 5, 1962
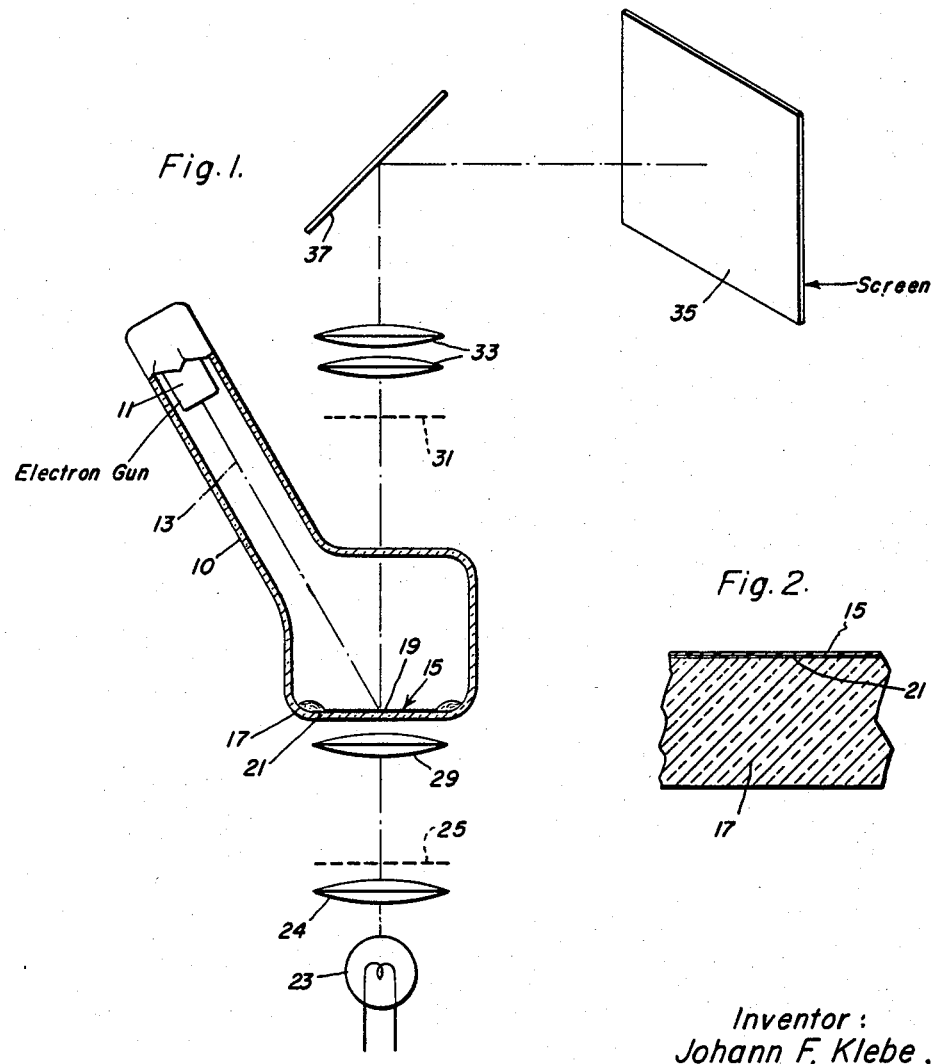
Inventor:
Johann F. Klebe,
by Joseph T. Cohen
His Attorney.

United States Patent Office 3,125,637
Patented Mar. 17, 1964

3,125,637
COMPOSITION AND APPARATUS USED IN
THE SAME
Johann F. Klebe, Schenectady, N.Y., assignor to
General Electric Company, a corporation of New
York
Filed June 5, 1962, Ser. No. 200,144
8 Claims. (Cl. 178—7.5)

This invention is concerned with compositions of the matter having low volatilities and enhanced resistance to radiation and to apparatus using such compositions. More particularly, the invention relates to a composition of matter having a general formula (I) $(CH_3)(C_6H_5)_2Si—(CH_2)_2—Z$ where Z is a member selected from the class consisting of biphenyl and terphenyl radicals, wherein one phenyl radical of the biphenyl radical may be ortho, para or meta to the other phenyl radical, and the terphenyl radical is substituted in the 4' position (denoted by the asterisk) in accordance with the designation represented by the following terphenyl radical formula:

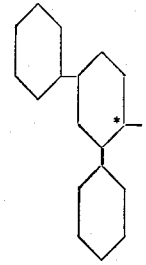

Included in the invention is the use of the aforesaid compositions as the deformable medium in a projection system of the type described in U.S. Patent 2,943,147, issued June 28, 1960, and assigned to the same assignee as the present invention.

In addition to the uses described above, the aforesaid compositions of the matter because of their low volatility, radiation resistance, and high temperature stability are useful as lubricating, insulating and protective fluids for electrical equipment, such as transformers, capacitors, etc., which will be maintained in an area subject to ionizing radiation such as in an atomic plant.

The compositions of the present invention generally may be prepared by reacting a compound having the formula $$Z—CH_2CH_2—Cl$$

[which in turn can be prepared by reaction of a compound having the formula $Z—CH_2CH_2OH$ (derived from the reaction of the Grignard of Br-Z with ethylene oxide) with anhydrous $ZnCl_2$ and hydrochloric acid] with an organosilyl lithium solution obtained by reacting diphenylmethylchlorosilane with lithium in a solvent such as tetrahydrofuran, where Z has the meaning given above.

In order that those skilled in the art may better understand how the present invention may be practiced, the following examples are given by way of illustration and not by way of limitation. All parts and percents are by weight.

EXAMPLE 1

This example illustrates the preparation of (2-o-biphenylylethyl) diphenylmethylsilane having the formula (II)

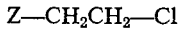

More particularly, 50 grams 2-o-biphenylylethanol-1 [prepared in accordance with the directions of J. Cologne et al. in Bull. Soc. Chim. France, page 825 (1948)], were reacted with 60 grams anhydrous zinc chloride and 50 parts 38% HCl under reflux for 4 hours, after which o-(2-chloroethyl)-biphenyl was isolated. About 215 grams methyldiphenylchlorosilane, dissolved in 1.75 liters dry tetrahydrofuran was added slowly with stirring to 32 grams of freshly cut lithium wire. The reaction started immediately with heat evolution and formation of a dark red-brown product. The temperature of the mixture was not allowed to exceed 30° by adjusting the addition rate appropriately. Stirring was continued for 12 hours after completion of the addition. The obtained silyl lithium solution was filtered from the excess lithium and was added with stirring to 180 grams of the above-described o-(2-chloroethyl)biphenyl. The temperature was kept below 35° C. Stirring was continued at around room temperature for about 12 hours after which the reaction product was poured into 3 liters of water, extracted with diethyl ether, washed with water, dried, and the solvent removed. Distillation of this product gave 220 grams of the above methyldiphenylbiphenylylethylsilane of Formula II boiling at 225–230° C./0.01 mm. and had a density $d_{25} = 1.063$ and a refractive index $\eta_{20}^D$ 1.6142. Analysis showed the compound to contain 7.2% hydrogen, 86.3% carbon, and 7.4% silicon as contrasted to the theoretical values of 6.9% hydrogen, 85.8% carbon and 7.3% silicon.

EXAMPLE 2

In this example the composition (2-p-biphenylylethyl) diphenylmethylsilane having the formula (III)

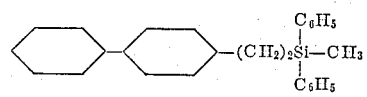

was prepared similarly as was done in Example 1 with the exception that p-(2-chloroethyl)biphenyl was used in place of the o-(2-chloroethyl)-biphenyl employed in Example 1. The composition of Formula III obtained after isolation, employing the same procedures as was done in the preceding example, had a melting point of 55–56° C., a boiling point of 247–257° C./0.01 mm. The composition was found to have 7.0% hydrogen, 85.9% carbon and 7.1% silicon.

EXAMPLE 3

This example illustrates the preparation of the compound [2-(4'-m-terphenylyl)ethyl]diphenylmethylsilane having the formula (IV)

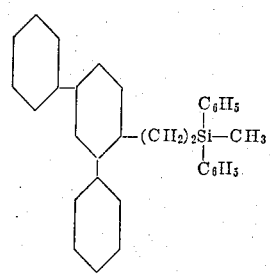

The compound 4'-(2-hydroxyethyl)-m-terphenyl was prepared by first forming a mixture of 300 grams of 4'-m-bromoterphenyl and 109 grams of ethyl bromide dissolved in 1.5 liters of tetrahydrofuran. This mixture was added with stirring over a period of 3 hours to 50 grams of magnesium. At the end of this time, the stirred mixture was heated at its reflux temperature for an additional 15 hours. To the Grignard solution thus obtained was added over a period of 4 hours, 300 grams of ethylene oxide gas while maintaining the reaction temperature at around room temperature. The reaction complex which was thus obtained was stirred for an additional 15 hours and then decomposed with ammonium chloride solution. The product was extracted with diethyl ether, the product dried, the solvent removed, and the residue was fractionally distilled to give a colorless liquid which boiled at 180–200° C./0.1 mm. The product, which was a wax melting at about 50–55° C., was identified as 4′-(2-hydroxyethyl)-m-terphenyl. Thereafter, a mixture of 55 grams of the above 4′-(2-hydroxyethyl)-m-terphenyl, 60 grams of anhydrous zinc chloride and 50 grams of 38% hydrochloric acid was refluxed for 4 hours. The mixture was then poured into 500 cc. water, the product extracted with diethyl ether, the diethyl ether layer washed with water and dried with sodium sulfate. The product was fractionally distilled after removal of the solvent to yield 4′-(2-chloroethyl)-m-terphenyl boiling at 200–210° C./0.1 mm. Thereafter, 34 grams of methyldiphenylchlorosilane was converted into methyldiphenyllithiosilane in 250 cc. of tetrahydrofuran as described in the foregoing Example 2. This solution was added with stirring at room temperature to 40 grams of the 4′-(2-chloroethyl)-m-terphenyl over a period of 1 hour. The stirred mixture was refluxed for 2 additional hours and then poured into 1 liter of water, extracted with diethyl ether, washed with water and fractionally distilled after removal of the solvent to give a product having Formula IV, boiling at 230–240° C./0.01 mm., and a melting point of 103–105° C. Analysis showed the compound to contain 6.78% hydrogen, 87.3% carbon and 6.7% silicon; theoretical values 6.6% hydrogen, 87.2% carbon and 6.2% silicon.

The above class of compositions had low vapor pressures evidenced small viscosity changes when subjected to irradiation with high energy electrons, and exhibited low gas evolution under the influence of high energy electron irradiation, making them especially useful in projection apparatus described in the aforesaid U.S. Patent 2,943,147. In this patent (which by reference is made part of the disclosures of the instant application) is disclosed a projection system employing a deformable medium having a high resistivity which is responsive to an electron beam which is velocity modulated. In general, this apparatus, which is illustrated in FIG. 1 of the attached drawing, comprises an evacuated glass envelope 10 containing an electron gun 11 for producing an electron beam 13 and deflecting it in a rectangular raster over the surface of a transparent deformable medium 15 that is within a portion 19 of the transparent container. An enlarged view of this portion of the assembly is shown in FIG. 2. The beam is preferably velocity modulated by a television signal that is applied to the deflection means (not shown) in the electron gun. The deformable medium has a center portion 19 of decreasing thickness, coincident with the raster area of the beam which is produced by electrons from the beam that are attracted to a conducting coating 21 on the inner surface of the container. These electrons also produce deformations in the surface of the deformable medium, the amplitudes of which are a function of the number of electrons deposited by the beam at the various points on the surface of the medium. Consequently, the amplitudes of these deformations are a function of the television signal modulating electron beam 13.

These deformations are utilized to diffract light from a light source 23 in an optical system which is illustrated as including a lens 24 that images light source 23 on the surface of medium 15 through a bar and slit system 25. Another lens 29 images the slits of system 25 on the bars of another bar and a slit system 31 in the absence of deformations in the surface of the medium. However, any deformations phase diffract the light so that it passes through the slits in the system with an intensity that corresponds to the amplitudes of the deformations and thus the amplitudes of the applied television signal. The light passing through system 29 is imaged by a projection lens 33 on a screen 35 after reflection from a mirror 37.

If a conventional deformable medium is utilized in the illustrated system, the average charge density produces a force on the medium that overcomes the surface tension from the excess medium outside the raster area and decreases the portion 19 of medium 15 to zero thickness. Then, of course, no deformations can be formed and the system becomes inoperative until the medium is replaced.

In this U.S. Patent 2,943,147, it is stated that if the medium has the property of decreasing in resistivity with decreasing thickness, portion 19 does not decrease to zero thickness under the pressure of the charges but rather maintains a thickness the value of which is a function of the magnitude of charge density on the surface of the medium. With a decrease in resistivity, the time constant is decreased for the passage of leakage current from the surface of the medium to the conducting coating 21 beneath it, resulting in increase in leakage current, which decreases the charge density on the surface of the medium thereby relieving the pressure to some degree. Eventually, an equilibrium condition is attained in which the pressure from the charges on the surface of the medium equals the pressure from the surface tension on the excess medium around the raster. Then the thickness at this equilibrium condition is maintained. The charge density on the surface of the medium never decreases to zero due to the leakage because it is continually replaced by the electrons from the beam.

The deformable compositions described in the aforesaid patent U.S. 2,943,147 as suitable for the medium are required to be transparent, be capable of withstanding electron bombardment without significant decomposition, have a viscosity at the operating temperature (between about 25° C. and 100° C.) of approximately 100 to 50,000 centistokes, and the deformable composition must not decompose the conducting coating. The medium must also have a resistivity that varies within the range of approximately $10^{14}$ to $10^{11}$ ohms-cm., with the average resistivity at the stable thickness being approximately $10^{11}$ ohms-cm.

The silanes prepared in Examples 1 to 3 were tested by means of a test for their radiation resistance in an electron beam under accelerated conditions whereby these fluids would be expected to operate in the above-described projection system. Thus, the compositions were subjected to electron irradiation with a 1500 kv. resonant transformer at a current input of 200–500 microamperes at a dose of $20$–$50 \times 10^6$ roentgens/minute. The following Table I shows the total number of molecules of gas per hundred electron volts absorbed (identified as "G gas"), as well as the change in viscosity (in centistokes) prior to irradiation (identified as "$\eta_0$, cs.") and after irradiation (identified as "$\eta$, cs.") at the temperature at which irradiation was measured.

*Table 1*

| Composition of— | G gas | $\eta_0$, cs. | | $\eta$, cs. | |
|---|---|---|---|---|---|
| | | Temp., ° C. | Visc. | Temp., ° C. | Visc. |
| Example 1 | 0.062 | 25 | 1,800 | 25 | 4,300 |
| Example 2 | 0.048 | 25 | 870 | 25 | 1,392 |
| | | 100 | 9 | 100 | 12 |
| Example 3 | 0.039 | 75 | 200 | 75 | 280 |

To further evaluate the compositions described and claimed in the instant application, each of the compositions of Examples 1 and 2 was tested in the apparatus described in U.S. Patent 2,943,147 mentioned previously, as the deformable medium recited in the patent. It was found that sharp, viewable images of good light intensity were obtained. To further establish the usefulness of these compositions, these materials were then subjected to an electron-raster test using 10 kv. and 2 to 3 microamperes. This test involved subjecting the deformable fluid to constant electron irradiation for a time until first evidence of gelation (called "incipient gel formation") was noted. This is an accelerated test because in the usual use of the aforesaid apparatus the deformable medium will be constantly replenished and removed from the zone of irradiation. It was found that the aforesaid compositions when subjected to this severe test, in the case of the composition of Example 1 did not show incipient gel formation until after 72 minutes and in the case of the composition of Example 2, the latter did not show incipient gel formation until after 68 minutes, indicating the eminent stability of these compositions under radiation conditions.

It will, of course, be apparent to those skilled in the art that in addition to the organosilicon compositions described above for use in the aforesaid projection apparatus, other organosilicon compositions conforming to Formula I may be used without departing from the scope of the invention. More particularly, other organosilicon compositions wherein the biphenyl radical is nuclearly attached to other positions than in the positions recited in the foregoing examples, can be used for the above purposes.

What I claim as new and desire to secure by Letters Patent of the United States is:

1. A projection system comprising a container having a conducting interior, a deformable medium in said container comprising a composition having the formula $$(CH_3)(C_6H_5)_2Si-(CH_2)_2-Z$$

where Z is a member selected from the class consisting of biphenyl and terphenyl radicals and the terphenyl radical is substituted in the 4' position, an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

2. A projection system comprising a container having a conducting interior, a deformable medium in said container comprising a composition having the formula

an electron beam means for producing an electrical charge on the surface of said deformable medium as a function of an applied electrical signal and cooperating with said conducting material to subject the medium to the deforming force to produce the deformations on the surface of said medium, and a light and optical system for projecting light as a function of the deformations in the surfaces of said medium.

3. A projection system comprising a container having a conducting interior, a deformable medium in said container comprising a composition having the formula

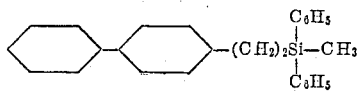

an electron beam means for producing an electrical charge on the surface of said deformable medium as a function of an applied electrical signal and cooperating with said conducting material to subject the medium to the deforming force to produce the deformations on the surface of said medium, and a light and optical system for projecting light as a function of the deformations in the surfaces of said medium.

4. A projection system comprising a container having a conducting interior, a deformable medium in said container comprising a composition having the formula

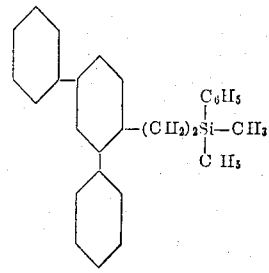

an electron beam means for producing an electrical charge on the surface of said deformable medium as a function of an applied electrical signal and cooperating with said conducting material to subject the medium to the deforming force to produce the deformations on the surface of said medium, and a light and optical system for projecting light as a function of the deformations in the surfaces of said medium.

5. A composition of matter having the general formula $$(CH_3)(C_6H_5)_2Si-(CH_2)_2-Z$$

where Z is a member selected from the class consisting of biphenyl and terphenyl radicals, the terphenyl radical being substituted in the 4' position.

6. A composition of matter having the formula

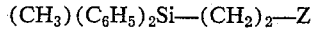

7. A composition of matter having the formula

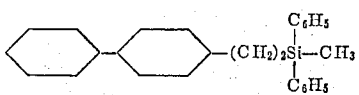

8. A composition of matter having the formula

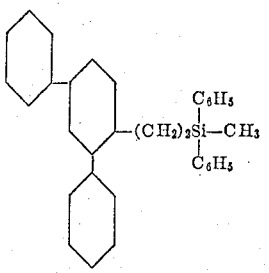

No references cited.